US009568722B2

(12) United States Patent
Reimer et al.

(10) Patent No.: US 9,568,722 B2
(45) Date of Patent: Feb. 14, 2017

(54) ILLUMINATION DEVICE FOR AN OPTICAL VIEWING APPARATUS

(71) Applicant: Carl Zeiss Meditec AG, Jena (DE)

(72) Inventors: Peter Reimer, Ellwangen (DE); Daniel Kolster, Oberkochen (DE); Franz Merz, Aalen (DE); Stefan Meinkuss, Nattheim (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 14/752,693

(22) Filed: Jun. 26, 2015

(65) Prior Publication Data

US 2015/0378142 A1 Dec. 31, 2015

(30) Foreign Application Priority Data

Jun. 26, 2014 (DE) .................. 10 2014 212 373

(51) Int. Cl.
*G02B 21/06* (2006.01)
*G02B 21/08* (2006.01)
(Continued)

(52) U.S. Cl.
CPC .......... *G02B 21/06* (2013.01); *G02B 21/0012* (2013.01); *G02B 21/082* (2013.01); *G02B 21/125* (2013.01)

(58) Field of Classification Search
CPC . G02B 21/0012; G02B 21/125; G02B 21/082; G02B 21/084; G02B 21/086; G02B 21/088; G02B 21/10; G02B 21/12; G02B 21/20; G02B 21/08
(Continued)

(56) References Cited

U.S. PATENT DOCUMENTS 4,852,985 A 8/1989 Fujihara et al.
7,561,329 B2 * 7/2009 Zahniser .............. G02B 21/086
359/368
(Continued)

FOREIGN PATENT DOCUMENTS

DE 198 56 847 A1 6/1999
DE 10 2012 217 967 A1 4/2014
(Continued)

OTHER PUBLICATIONS

STIC Search.*
(Continued)

*Primary Examiner* — Stephone B Allen
*Assistant Examiner* — Travis Fissel
(74) *Attorney, Agent, or Firm* — Walter Ottesen, P.A.

(57) ABSTRACT

An illumination device for an optical viewing apparatus has a light source including a first individual light source and a second individual light source arranged in a plane. The first individual light source has a first midpoint and the second individual light source has a second midpoint. An axial direction is defined by a vector from the second midpoint to the first midpoint. An illumination optical unit defines an optical axis which is arranged perpendicularly to the plane and intersects the plane at an intersection point. The light source is imaged toward infinity by the illumination optical unit. The first individual light source has an extent along the axial direction. The midpoint is offset by an amount ($\Delta$) in a positive direction along the axial direction relative to the intersection. The relationship $0.1*L1 \le \Delta \le 1*L1$ is satisfied for the offset.

8 Claims, 3 Drawing Sheets

(51) Int. Cl.
*G02B 21/12* (2006.01)
*G02B 21/00* (2006.01)

(58) Field of Classification Search
USPC .................................................. 359/385–390
See application file for complete search history.

(56) References Cited

U.S. PATENT DOCUMENTS

| | | | |
|---|---|---|---|
| 7,852,553 | B2 | 12/2010 | Tsutsui et al. |
| 8,125,709 | B2 | 2/2012 | Hoering et al. |
| 2003/0042493 | A1 | 3/2003 | Kazakevich |
| 2008/0204865 | A1* | 8/2008 | Yoneyama ............. G02B 21/16 359/381 |
| 2009/0079850 | A1* | 3/2009 | Okamoto ............. G02B 21/367 348/231.99 |
| 2010/0302630 | A1* | 12/2010 | Paulus ................... G02B 21/12 359/385 |
| 2011/0127405 | A1 | 6/2011 | Grossman et al. |
| 2012/0057013 | A1 | 3/2012 | Ishiwata |
| 2013/0229626 | A1* | 9/2013 | Zuend ...................... A61B 3/13 351/221 |

FOREIGN PATENT DOCUMENTS

| | | |
|---|---|---|
| GB | 2 436 870 A | 10/2007 |
| JP | 2005-10296 A | 1/2005 |
| JP | 2008-139820 A | 6/2008 |

OTHER PUBLICATIONS

English translation and the Office action of the German Patent Office dated Mar. 13, 2015 in German patent application 10 2014 212 373.9 on which the claim of priority is based.

English translation and extended search report of the European Patent Office dated Nov. 23, 2015 in corresponding European application 15172226.1-1562.

* cited by examiner

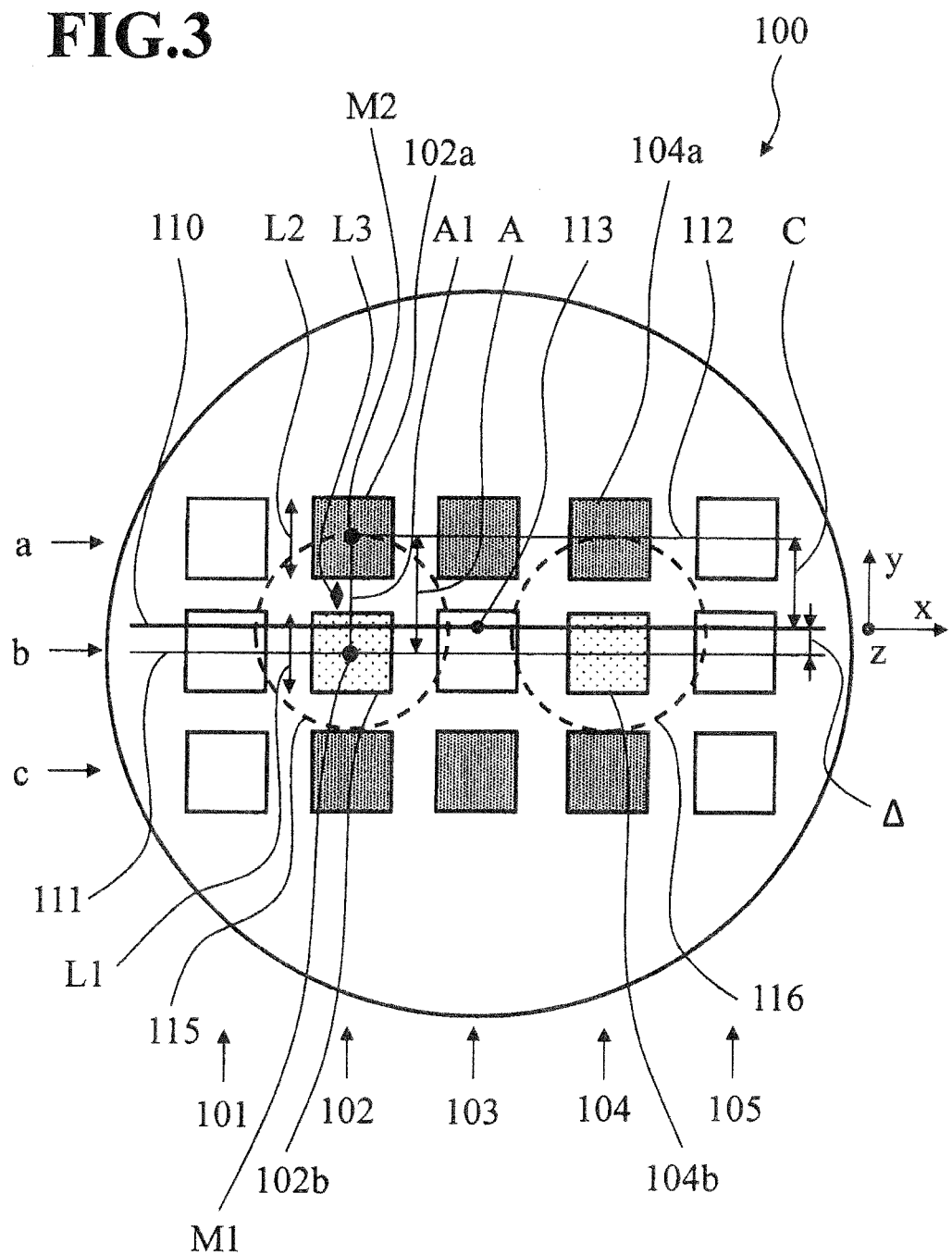

ILLUMINATION DEVICE FOR AN OPTICAL VIEWING APPARATUS

CROSS REFERENCE TO RELATED APPLICATION

This application claims priority of German patent application no. 10 2014 212 373.9, filed Jun. 26, 2014, the entire content of which is incorporated herein by reference.

FIELD OF THE INVENTION

The invention relates to an illumination device for an optical viewing apparatus. The illumination device has a light source, including a first individual light source and a second individual light source, which are arranged in a light source plane. The first individual light source has a first midpoint M1 and the second individual light source has a second midpoint M2. A first axial direction A1 is defined by a vector from the second midpoint M2 to the first midpoint M1. Through an illumination optical unit, an optical axis Z is defined which is arranged perpendicularly to the light source plane and intersects the light source plane at an intersection point, wherein the light source is imaged toward infinity by the illumination optical unit. The first individual light source has a first extent L1 along the first axial direction A1.

BACKGROUND OF THE INVENTION

A midpoint of an individual light source can be defined for example geometrically as an area centroid of a light exit surface of the individual light source. Alternatively, a midpoint of an individual light source can also be defined optically as that point in a light exit surface of the individual light source at which a luminance of the emitted light radiation has a maximum. In the context of the present invention, an extent of an individual light source in a predefined axial direction is generally defined as an extent of a light exit surface of the individual light source in the predefined axial direction through a midpoint of the individual light source, the midpoint being defined as above, for example. In particular, the first extent L1 of the first individual light source is defined as the extent of a light exit surface of the first individual light source in the direction of the first axial direction A1 through the midpoint M1 of the first individual light source.

In the course of the use of an optical viewing apparatus, for example of a surgical microscope, different illumination requirements may occur during operation.

In ophthalmo-cataract surgery, for example, it may be necessary to be able to change very rapidly a plurality of properties of the illumination device, such as, for example, the size of the illumination spots, the illumination angles and/or the brightness of the illumination depending on the respective operation situation. The combination of a plurality of properties of an illumination device constitutes a particular challenge under the confined space conditions of a surgical microscope.

Limits are imposed on the miniaturization of illumination devices which emit high light powers. The light emission of a light source is dependent on its light-emitting surface. Mechanical or electrical aspects, such as mechanical mounting or current supply, additionally have to be taken into account when light sources are combined. Thermal properties also limit miniaturization.

SUMMARY OF THE INVENTION

Therefore, it is an object of the invention to provide a miniaturized illumination device for an optical viewing apparatus, with which illumination device different illumination variants can be provided very rapidly in conjunction with sufficiently high light power.

The illumination device of the invention is for an optical viewing apparatus. The illumination device includes: a light source defining a light source plane and having a first individual light source and a second individual light source; the first and the second individual light sources being arranged in the light source plane; the first individual light source having a first midpoint M1; the second individual light source having a second midpoint M2; the second midpoint M2 and the first midpoint M1 defining a vector from the second midpoint M2 to the first midpoint M1; the vector defining a first axial direction A1; illumination optics defining an optical axis Z arranged perpendicular to the light source plane and intersecting the light source plane at an intersection point; the illumination optics being configured to image the light source toward infinity; the first individual light source having a first extent L1 along the first axial direction A1; the first midpoint M1 being offset by an amount $\Delta$ in a positive direction along the axial direction A1 with respect to the intersection point; and, wherein the following relationship for the offset is satisfied: $0.1*L1 \leq \Delta \leq 1*L1$.

According to the invention, the midpoint M1 is offset by an absolute value $\Delta$ in the positive direction along the axial direction A1 relative to the intersection point of the optical axis Z through the light source plane, wherein the following relationship is fulfilled for the offset: $0.1*L1 \leq \Delta \leq 1*L1$, preferably $0.15*L1 \leq \Delta \leq 0.7*L1$, particularly preferably $0.2*L1 \leq \Delta \leq 0.5*L1$.

An illumination device includes a light source having two individual light sources, and an illumination optical unit. The two individual light sources are arranged in a light source plane, perpendicular to an optical axis Z of an illumination optical unit, and can emit light in the direction of the optical axis. The light source is imaged toward infinity by the illumination optical unit.

The first individual light source has a first midpoint M1 and the second individual light source has a second midpoint M2. A vector is defined from the second midpoint M2 to the first midpoint M1. The direction of the vector defines the first axial direction A1. Along the axial direction A1 with respect to the intersection point of the optical axis through the light source plane, it is possible to calculate a distance between the axial direction A1 and the intersection point. For this purpose, it is known from the vector calculation to form a perpendicular to the axial direction A1 which passes through the intersection point. If the first midpoint M1 lies on the perpendicular, the distance along the axial direction A1 with respect to the intersection point is equal to zero.

For the midpoint M1, the invention requires that the midpoint is offset by an absolute value $\Delta$ in the positive axial direction along the axial direction A1 relative to the intersection point of the optical axis Z through the light source plane. This offset is dependent on the size or extent L1 of the first individual light source along the axial direction. The following relationship is fulfilled for the offset: $0.1*L1 \leq \Delta \leq 1*L1$, preferably $0.15*L1 \leq \Delta \leq 0.7*L1$, particularly preferably $0.2*L1 \leq \Delta \leq 0.5*L1$.

The light emission of a light source is dependent on its light-emitting surface. Mechanical, electrical and thermal aspects have to be taken into account in the case of individual light sources being combined.

Three different illumination variants are providable very rapidly by two individual light sources. In a first illumination variant, only the first individual light source is activated. In a second illumination variant, only the second individual light source is luminous. A third illumination variant is realized if both individual light sources are switched on together.

The arrangement according to the invention of the first individual light source with an offset of its midpoint relative to the intersection point of the optical axis through the light source plane makes it possible to move the second individual light source nearer to the optical axis of the illumination optical unit. This affords advantages in particular in the case of a configuration of the illumination device with individual light sources which are switchable and/or regulatable independently of one another and with which different types of illumination can be set for different application purposes. It has been found that the claimed relationship for the offset constitutes a particularly good compromise for an illumination device for switching between an at least approximately coaxial illumination and an oblique illumination of an object in the object field, which compromise is additionally distinguished by a particularly low reflection of the illumination light at the optical elements in the illumination beam path. Given an offset by an absolute value Δ, a miniaturized illumination device having two individual light sources, with sufficiently high light power and high illumination quality, is thus possible.

In one configuration of the invention, the midpoint M1 is offset by an absolute in the direction of a second axial direction, which runs perpendicularly to the first axial direction A1, relative to the intersection point of the optical axis Z through the light source plane.

Via an offset of the two individual light sources in a second axial direction perpendicular to the first axial direction A1, an optical arrangement of the two individual light sources can be improved even further, taking account of mechanical, electrical and thermal conditions.

In one configuration of the invention, the first individual light source is arranged in a first row of an array of individual light sources and the second individual light source is arranged in a second row of the array of individual light sources, and the first individual light source and the second individual light source are controllable independently of one another.

The arrangement of the individual light sources in an array enables a compact construction of the illumination light source. Mutually independent control of the individual light sources enables different illumination variants to be set very rapidly.

In one configuration of the invention, the array of individual light sources includes at least four individual light sources.

More than three different illumination variants are settable by at least four individual light sources.

In one configuration of the invention, the individual light sources arranged in the array are embodied in square, rectangular or round fashion.

Production of an array having individual light sources of the abovementioned shape is cost-effective.

In one configuration of the invention, a control device is present, by which the brightness of each individual lights source is controllable by voltage and/or current control or by a pulse width modulation with freely settable pulse ratios.

The illumination variants are settable by the specific control or regulation of individual light sources at specific positions of the array. The brightness of the illumination light can be increased by one or a plurality of individual light sources being switched on. Advantageously, the brightness of the individual light sources can additionally be defined by control of the voltage and/or of the current. In order to be able to set the individual light sources in a wide brightness range in very fine gradations, control can advantageously be effected by pulse width modulation with freely settable pulse ratios.

In accordance with a second aspect of the invention, a surgical microscope including an illumination device described above is provided.

In the case of the configuration of a surgical microscope including an illumination device of the type described above, various illumination variants can advantageously be realized. Typically, the illumination light is coupled into a first monoscopic or stereoscopic viewing beam path. Coupling into a second monoscopic or stereoscopic viewing beam path is also conceivable. As a result of the arrangement of the individual light sources in a two-dimensional array, different illumination angles can be achieved by selective control of the individual light sources. A red reflex illumination can advantageously be formed by coaxial coupling of an illumination beam path into a viewing beam path.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
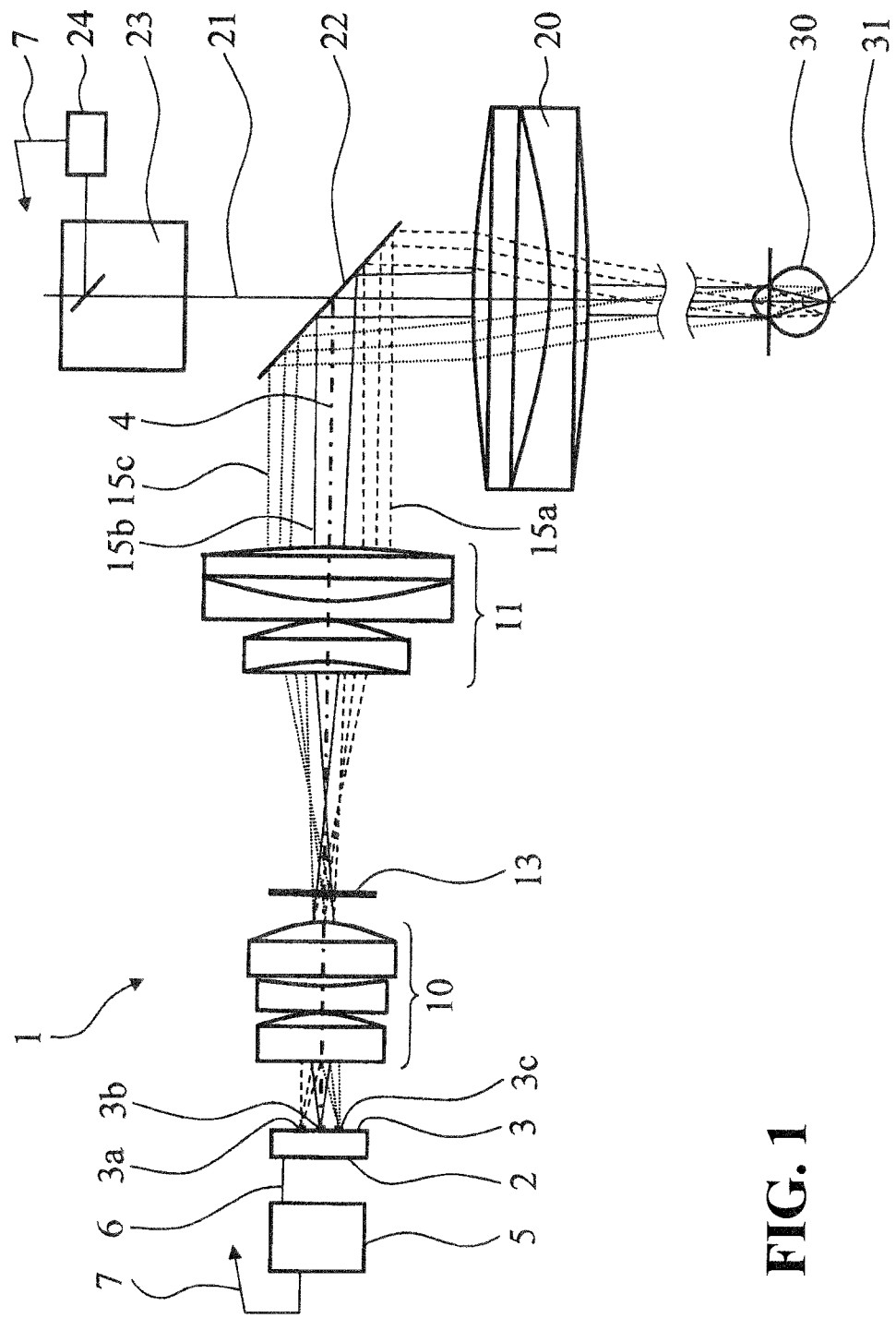
FIG. 1 shows a first embodiment of an illumination device according to the invention with a surgical microscope.

FIG. 1 shows a first embodiment of an illumination device 1 according to the invention with a surgical microscope. The surgical microscope is embodied as a stereomicroscope.

The illumination device 1 includes a light source unit 2, a first lens group 10, a luminous field stop 13 and a second lens group 11, which are arranged along an optical axis 4. The light source unit 2 has a two-dimensional individual light source array 3 including a first individual light source 3a, a second individual light source 3b and a third individual light source 3c. The individual light source array 3 includes further individual light sources (not illustrated). The individual light source array 3 is arranged in a first plane perpendicular to the optical axis 4. The center of the second individual light source is displaced by a small absolute value relative to the optical axis. The displacement is smaller than the diameter of the second individual light source 3b. The light source unit 2 is connected to a control device 5 via a line 6.

The illumination light beams generated by the individual light source array 3 are led through the first lens group 10, the luminous field stop 13 and the second lens group 11 and are coupled into a viewing beam path of the surgical microscope via a deflection element 22, for example a beam splitter. The surgical microscope includes a main objective 20 and an observation optical unit 23, which is merely indicated schematically. A stereoscopic viewing beam path for a first observer is embodied parallel to an optical axis 21. In this embodiment, the stereoscopic viewing beam path is arranged with a left and a right viewing beam path perpendicular to the illustrated plane of the drawing, such that the two optical axes of the left and right viewing beam paths are congruent in this view.

A camera 24 is coupled to one viewing beam path via a beam splitter, the camera being connected to the control device 5 via a line 7. An input-output unit (not illustrated) can be connected to the control device.

The first lens group 10 can include an individual lens or a plurality of lens elements. The first lens group 10 forms a collector optical unit.

The second lens group 11 together with the main objective 20 forms a condenser lens group. The second lens group 11 can include an individual lens or a number of lens elements. The illumination light is led below the main objective 20 in a parallel beam and is imaged toward infinity. The illumination light impinges on an object to be observed, an eye 30. In the eye 30, the light source image of the individual light sources is imaged on a fundus 31.

From the second individual light source 3b, a second illumination beam 15b runs parallel to the optical axis 4 and is coupled coaxially into the left viewing beam path. The light from the second individual light source 3b generates an illumination spot on the fundus 31 of the eye 30. An observer can perceive the light backscattered from the fundus 31 as red reflex when looking through the surgical microscope.

If the left viewing beam path is projected onto the fundus, it forms an approximately round cross section on the fundus. The illumination spot generated by the second individual light source 3b lies within the cross section.

A first illumination beam 15a running from the first individual light source 3a is led to the eye 30 at a small angle of approximately −2° with respect to the optical axis of one viewing beam path and forms a −2° illumination.

By contrast, a third illumination beam 15c running from the third individual light source 3c is led to the eye 30 at a small angle of approximately 2° with respect to the optical axis of one viewing beam path and forms a 2° illumination with respect to the opposite side of the optical axis.

The explanations described above apply both to a left and to a right viewing beam path. For the right viewing beam path the individual light source array 3 includes three further individual light sources situated behind the individual light sources (3a, 3b, 3c) in the plane of the drawing.

The light source unit 2 includes the individual light source array 3, wherein each individual light source is formed from an LED or an OLED. It is also conceivable for the individual light sources to include optical fibers and for the individual light sources to be formed from the fiber ends of the optical fibers. A very compact configuration of the individual light sources is thus achievable. In the case where the individual light sources are embodied as LEDs or OLEDs, the individual light sources can be electrically controlled very rapidly and simply. In the case of the configuration as exit end of optical fibers, no heat is generated in the plane of the two-dimensional array and heat-dissipating measures can be dispensed with at this location. The individual light source array 3 can also include a combination of LEDs, OLEDs and optical fibers. It is also conceivable for the individual light sources to be formed by lasers or excited converters. The individual light sources can have a square, rectangular or round imaging surface.

The control device 5 is configured to switch the first individual light source 3a, the second individual light source 3b, the third individual light source 3c and all further individual light sources (not illustrated) of the individual light source array on and off individually. Furthermore, the brightness of all the individual light sources can be set by control of the voltage or current of the individual light sources. Alternatively, the brightness is controllable by a pulse width modulation with freely settable pulse ratios. An electronic brightness setting of the individual light sources has the advantage that no movable parts, such as filters, for example, have to be introduced into the illumination beam path.

Figure 2:
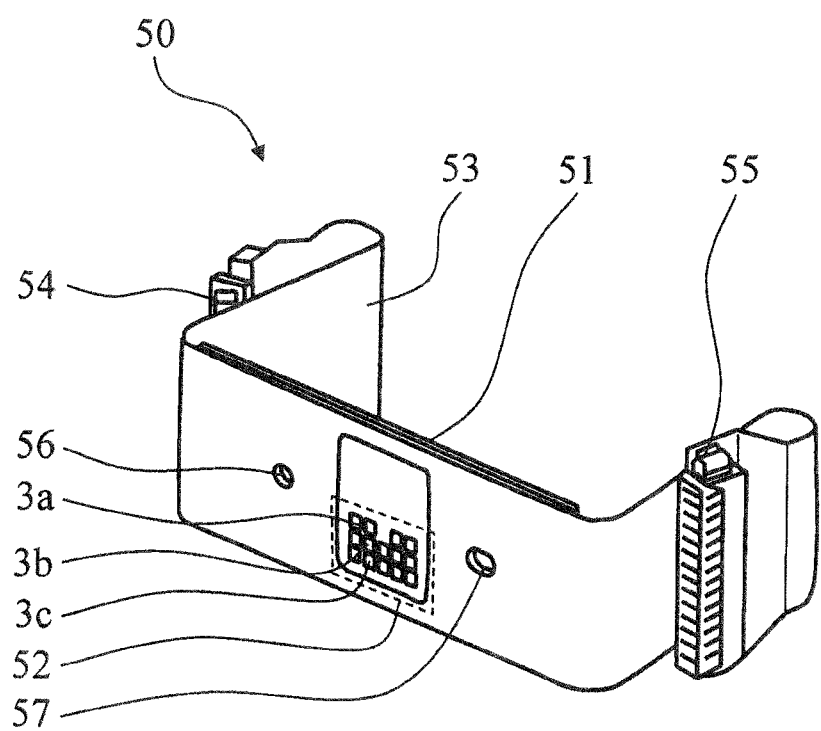
FIG. 2 shows one embodiment of a light source unit having an individual light source array; and, FIG. 3 shows an individual light source array arranged offset relative to the optical axis of the illumination beam path.

FIG. 2 shows one embodiment of a light source unit 50 having an individual light source array. The individual light source array is embodied as an LED matrix 52 having fourteen LED individual light sources. The LED individual light sources are arranged as SMD LEDs on a circuit board 51 and can each be driven individually. The anodes of all the individual light sources can be connected, while the emitters are led in each case via an individual line to the control device 5. However, it is also conceivable for the LED individual light sources to be electrically connected in a grid arrangement and to be driven via multiplex electronics. The multiplex electronics can be arranged on the circuit board 51 or integrated in the control unit 5. The circuit board 51 has a first cutout 56 and a second cutout 57 for a respective mechanical fixing element. The circuit board is connected to a ribbon cable 53. The ribbon cable has a first plug connector 54 and a second plug connector 55, with which the LED matrix 52 can be connected to the control device 5. Three LED individual light sources arranged in a column of the LED matrix 52 can form the first individual light source 3a, second individual light source 3b and third individual light source 3c illustrated in FIG. 1.

In the individual light source array, not all of the positions need be occupied by LED individual light sources. The light source unit 50 can be produced more expediently in this case. Possible evolution of heat by the illumination unit is reduced. Additional space is available for lines or electronic components.

FIG. 3 shows an individual light source array 100 arranged offset relative to an optical axis of the illumination beam path.

In the embodiment, the individual light sources are embodied as square LEDs. The individual light source array 100 includes 15 individual light sources. The individual light sources are arranged in a light source plane in the array. The light source plane is spanned in an X/Y-plane. An optical axis of the illumination optical unit runs perpendicularly to the light source plane parallel to a Z axis and intersects the light source plane at an intersection point 113.

The array includes three rows and five columns. The rows are designated by lower-case letters (a, b, c) and the columns are designated by (101, 102, 103, 104, 105). The position of an individual light source in the individual light source array can be unambiguously defined by the combination of the numeral of the respective column and the letter of the respective row.

The midpoints of the individual light sources of the first row (a) lie on a first straight line 112. The midpoints of the individual light sources of the second row (b) lie on a second straight line 111. The first straight line 112 and the second straight line 111 run parallel at a first distance A with respect to one another. The first distance A is 1.6 mm, for example.

A first individual light source at the position 102b has a first midpoint M1. A second individual light source at the position 102a has a second midpoint M2. A first axial direction A1 is defined from the second midpoint M2 to the first midpoint M1. In the embodiment, the first axial direction A1 is arranged in an opposite direction with respect to the Y axis.

The individual light sources in the second row (b) have first extents L1 along the first axial direction A1, the first extents being 1 mm in this embodiment. A second extent L2 of the individual light sources of the first row (a) along the first axial direction A1 is likewise 1 mm in this embodiment. The first extent L1 and the second extent L2 can be different or identical in magnitude. In the case of a round embodiment of the individual light sources, the first extent L1 can be equated with a first diameter of the individual light sources in the second row (b) and the second extent L2 can be equated with a second diameter of the individual light sources in the first row (a).

A third straight line 110 runs through the intersection point 113 of the optical axis through the light source plane in the X direction parallel to the first two straight lines. In this embodiment, the third straight line 110 is arranged orthogonally with respect to the first axial direction A1. The first midpoint M1 is thus offset by an absolute value Δ in the positive direction along the axial direction A1 relative to the intersection point 113.

The absolute value Δ is smaller than the first extent L1. In this case, the following relationship is fulfilled for the absolute value: 0.1*L1≤Δ≤1*L1, preferably 0.15*L1≤Δ≤0.7*L1, particularly preferably 0.2*L1≤Δ≤1*L1.

In this embodiment, the absolute value Δ is between 0.1 mm and 1 mm. In the embodiment in accordance with FIG. 3, the absolute value Δ=0.3 mm.

The first straight line 112 and the third straight line 110 run at a second distance C with respect to one another. The second straight line 111 is offset by an absolute value Δ with respect to the third straight line 110. The offset by the absolute value Δ thus holds true for all the individual light sources which are arranged in the second row (b).

A region that emits no light is situated between the individual light sources. This region has a width L3 parallel to the Y axis and can have a value of 0.6 mm, for example.

In accordance with FIG. 1, an individual light source is imaged on the fundus 31 of an eye 30 to be observed. Two individual light sources at the positions 102b and 104b are switched on.

The light from the individual light sources, as illustrated in FIG. 1, is imaged on the fundus 31 of the eye 30 to be observed by the illumination optical unit and the main objective 20. The imaging of an individual light source on the fundus 31 is designated as illumination spot. The individual light source at the position 102b is coaxially coupled into a left viewing beam path and forms a first illumination spot on the fundus. The individual light source at the position 104b is coaxially coupled into the right viewing beam path and forms a second illumination spot on the fundus.

In accordance with FIG. 1, the viewing device is focused onto an anterior lens chamber of the eye 30. The imagings of the left and right viewing beam paths projected on the fundus respectively bring about there a circular left observation spot and a right observation spot. The X/Y plane of the light source plane forms a conjugate location for the fundus imaging. The left observation spot is represented as a left circle 115 and the right observation spot as a right circle 116 in the X/Y plane.

The individual light sources are offset by the absolute value Δ relative to the third straight line 110. Nevertheless, the individual light source at the position 102b is situated within the left circle 115. That means that near-axis illumination with respect to the left axis of the viewing beam path is achievable despite the displacement or decentration of the individual light source 102b by the absolute value Δ. Near-axis illumination for the right viewing beam path is likewise achievable for an individual light source 104b since the illumination spot of the individual light source 104b lies within the right circle 116. The near-axis illumination brings about red reflex illumination with very good contrast and very good homogeneity. A first illumination variant is thus realized, which brings about red reflex illumination by activation of the individual light sources at the positions 102b and 104b. The first illumination variant thus has the effect of very good stereocoaxial illumination.

A second illumination variant is achievable by the activation of the two individual light sources at the positions 102a and 104a. The individual light source at the position 102a is coupled into the left viewing beam path and the individual light source at the position 104a is coupled into the right viewing beam path. The respective fundus spots are embodied in such a way that they lie partly within and partly outside the two observation spots. In the conjugate X/Y plane with respect to the fundus plane, this is evident by virtue of the fact that the left circle 115 passes through the individual light source at the position 102a. This likewise applies to the right circle 116 and the individual light source at the position 104a.

The second illumination variant constitutes oblique illumination, also designated as 2° illumination. The oblique illumination brings about a large depth effect in conjunction with acceptable homogeneity and good contrast.

A third illumination variant constitutes a combination of the first illumination variant and of the second illumination. The individual light sources at the positions (102a, 102b, 104a, 104b) are activated. The result is a bright image in conjunction with a medium depth effect but somewhat lower contrast.

The illumination variant optimized for the respective observation situation can be set in this way. The observer can change between coaxial illumination or oblique illumination or combine both types of illumination. In this case, the size of the fundus spots, the illumination angle and the brightness can be optimally adapted to the respective situation. The activation of additional individual light sources brings about a brightening of the image.

As a result of the decentration of the individual light sources by the absolute value Δ with respect to the third straight line 110, the properties of good coaxial illumination or red reflex illumination can be combined with the advantages of oblique illumination. At least three different illumination variants are settable. Consequently, very small individual light sources of high light intensity, for example LEDs, under very confined space conditions, can be integrated into a surgical microscope. In the case of miniaturization of the illumination light source, a very high-quality illumination device is providable with which different illumination variants are settable very rapidly in conjunction with sufficiently high light power.

It is understood that the foregoing description is that of the preferred embodiments of the invention and that various changes and modifications may be made thereto without departing from the spirit and scope of the invention as defined in the appended claims.

What is claimed is:

1. A surgical microscope for viewing an eye of a patient, the surgical microscope comprising:

an observation optical unit and a main objective defining an object plane;
said observation optical unit and said main objective conjointly defining a viewing beam path;
an illumination device having a light source for generating illuminating light and illumination optics configured for imaging said illuminating light at infinity;
said light source defining a light source plane and having a first individual light source and a second individual light source;
a deflection element arranged downstream of said illumination optic for coupling said illumination light into said viewing beam path and toward said eye via said main objective as a beam of parallel rays so as to permit focusing of said parallel rays beyond said object plane and within said eye;
said first and said second individual light sources being arranged in said light source plane;
said first individual light source having a first midpoint (M1);
said second individual light source having a second midpoint (M2);
said second midpoint (M2) and said first midpoint (M1) defining a vector from said second midpoint (M2) to said first midpoint (M1);
said vector defining a first axial direction (A1);
said illumination optics defining an optical axis (Z) arranged perpendicular to said light source plane and intersecting said light source plane at an intersection point;
said first individual light source having a first extent (L1) along said first axial direction (A1);
said first midpoint (M1) being offset by an amount ($\Delta$) in a positive direction along said axial direction (A1) with respect to said intersection point so as to bring said second individual light source closer to said optical axis causing said first and second individual light sources to effect illuminations at respectively different angles with respect to said optical axis thereby providing two types of illumination of the ocular fundus of the eye when said first and second light sources are switched on separately; and
wherein the following relationship for said offset is satisfied: $0.1*L1 \leq \Delta \leq 1*L1$.

2. The surgical microscope of claim 1, wherein the illumination device defines a second axial direction (A2) perpendicular to said first axial direction (A1); and, said first midpoint (M1) is offset a second amount in the direction of said second axial direction with respect to said intersection point.

3. The surgical microscope of claim 1, wherein:
said light source defines an array of individual light sources having a first row and a second row;
said first individual light source is arranged in said first row of said array;
said second individual light source is arranged in said second row of said array; and,
said first individual light source and said second individual light source are mutually independently controllable.

4. The surgical microscope of claim 3, wherein said light source further has at least a third and a fourth individual light source; and, said third and said fourth individual light sources are arranged in said array.

5. The surgical microscope of claim 4, wherein said individual light sources are configured in one of a square, rectangular and round manner.

6. The surgical microscope of claim 1 further comprising a control unit configured to control the brightness of each of said individual light sources via control of at least one of voltage, current control and pulsewidth modulation with freely settable pulse ratios.

7. The surgical microscope of claim 1, wherein the following relationship for said offset is satisfied: $0.15*L1 \leq \Delta \leq 0.7*L1$.

8. The surgical microscope of claim 1, wherein the following relationship for said offset is satisfied: $0.2*L1 \leq \Delta \leq 0.5*L1$.

* * * * *

UNITED STATES PATENT AND TRADEMARK OFFICE
CERTIFICATE OF CORRECTION

PATENT NO. : 9,568,722 B2  
APPLICATION NO. : 14/752693  
DATED : February 14, 2017  
INVENTOR(S) : P. Reimer et al.

Page 1 of 1

It is certified that error appears in the above-identified patent and that said Letters Patent is hereby corrected as shown below:

In the Specification

In Column 7:  
Line 28: delete "$0.2*L1 \leq \Delta \leq 1*L1$" and insert -- $0.2*L1 \leq \Delta \leq 0.5*L1$ -- therefor.

Signed and Sealed this  
Eleventh Day of April, 2017

Michelle K. Lee  
*Director of the United States Patent and Trademark Office*